United States Patent
Chen et al.

(10) Patent No.: US 12,058,947 B2
(45) Date of Patent: Aug. 13, 2024

(54) APPARATUS FOR LOCATING AN AGRICULTURAL MACHINE ON THE BASIS OF SENSOR DATA AND IMAGE SEGMENTATION

(71) Applicant: ZF Friedrichshafen AG, Friedrichshafen (DE)

(72) Inventors: Zhihu Chen, Constance (DE); Benjamin Rippel, Immenstaad (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 507 days.

(21) Appl. No.: 17/296,990

(22) PCT Filed: Nov. 12, 2019

(86) PCT No.: PCT/EP2019/081004
§ 371 (c)(1),
(2) Date: May 26, 2021

(87) PCT Pub. No.: WO2020/108981
PCT Pub. Date: Jun. 4, 2020

(65) Prior Publication Data
US 2022/0015280 A1    Jan. 20, 2022

(30) Foreign Application Priority Data
Nov. 28, 2018    (DE) ................ 10 2018 220 406.3

(51) Int. Cl.
*A01B 69/00* (2006.01)
*A01B 69/04* (2006.01)
(Continued)

(52) U.S. Cl.
CPC ......... *A01B 69/008* (2013.01); *G05D 1/0219* (2013.01); *G05D 1/0246* (2013.01);
(Continued)

(58) Field of Classification Search
CPC ........... A01B 69/008; G06T 7/80; G06T 7/10; G06T 7/70; G06T 2207/30252; G05D 1/0219; G05D 1/0246; G05D 2201/0201
(Continued)

(56) References Cited

U.S. PATENT DOCUMENTS

2009/0037059 A1    2/2009   Huster et al.
2012/0085458 A1    4/2012   Wenzel
(Continued)

FOREIGN PATENT DOCUMENTS

CN    104133192 A    11/2014
CN    107627957 A    1/2018
(Continued)

OTHER PUBLICATIONS

English Translation for DE-102011078290-A1 (Year: 2023).*
(Continued)

*Primary Examiner* — Mahmoud S Ismail
(74) *Attorney, Agent, or Firm* — LEYDIG, VOIT & MAYER, LTD.

(57) ABSTRACT

An apparatus for localizing an agricultural machine in an agricultural useful area. The apparatus includes an input interface configured to receive, as input, a route predefined in the useful area and image data related to a monitoring region of the useful area detected by a sensor and located in a vicinity of the agricultural machine. The apparatus also includes an evaluation unit configured to detect a position of the monitoring region with respect to the predefined route and an output interface configured to output the detected position.

9 Claims, 2 Drawing Sheets

(51) Int. Cl.
  *G05D 1/00* (2006.01)
  *G06T 7/10* (2017.01)
  *G06T 7/70* (2017.01)
  *G06T 7/80* (2017.01)

(52) U.S. Cl.
  CPC .................. *G06T 7/10* (2017.01); *G06T 7/70* (2017.01); *G06T 7/80* (2017.01); *G06T 2207/30252* (2013.01)

(58) Field of Classification Search
  USPC .......................................................... 701/50
  See application file for complete search history.

(56) References Cited

U.S. PATENT DOCUMENTS

| | | | |
|---|---|---|---|
| 2013/0110358 A1 | 5/2013 | Merx et al. | |
| 2018/0027179 A1 | 1/2018 | Matsuzaki et al. | |
| 2018/0365859 A1* | 12/2018 | Oba | H04N 23/90 |
| 2020/0411163 A1* | 12/2020 | Zehavi | A61B 6/505 |
| 2022/0015280 A1 | 1/2022 | Chen et al. | |
| 2022/0030763 A1* | 2/2022 | Morrison | G05D 1/0246 |

FOREIGN PATENT DOCUMENTS

| | | | | |
|---|---|---|---|---|
| DE | 19921995 A1 | 11/2000 | | |
| DE | 10328395 A1 | 3/2005 | | |
| DE | 102011078290 A1 * | 1/2013 | .......... | A01B 69/001 |
| DE | 102011078290 A1 | 1/2013 | | |
| EP | 2586282 A1 | 5/2013 | | |
| EP | 19804692 A | 10/2021 | | |
| WO | WO 2018087546 A1 | 5/2018 | | |

OTHER PUBLICATIONS

David Ball, et al., "Vision-based Obstacle Detection and Navigation for an Agricultural Robot", Journal of Field Robotics, Jan. 13, 2016, pp. 1107-1130, vol. 33, No. 8, Wiley Periodicals, New York City, New York, USA.

* cited by examiner

APPARATUS FOR LOCATING AN AGRICULTURAL MACHINE ON THE BASIS OF SENSOR DATA AND IMAGE SEGMENTATION

CROSS REFERENCE TO RELATED APPLICATIONS

This application is a U.S. National Phase application under 35 U.S.C. § 371 of International Application No. PCT/EP2019/081004 (WO 2020/108981 A1), filed on Month Nov. 12, 2019, and claims benefit to German Patent Application No. DE 10 2018 220 406.3, filed on Nov. 28, 2018.

FIELD

The present disclosure relates to an apparatus for localizng an agricultural machine, to the use of such an apparatus in an agricultural machine, to a method for localizing an agricultural machine, and to a computer program product.

BACKGROUND

In agricultural regions, working agricultural useful areas plays a central role. For example, during the harvesting of cereals, but also of field crops, the harvested crop must be stored or windrowed in a specific form (for example in rows). For such purposes, agricultural machines are used, which travel along a specific route in the agricultural useful area, while agriculturally working the area.

In order to carry out the agricultural working processes reliably, it is expedient to be able to determine the position of the agricultural machine continuously. For example, the position of the agricultural machine can be ascertained with very high accuracy by a global positioning system (GPS).

Solutions for determining the position of the agricultural machine during agricultural working processes are known in the prior art. For example, WO 2018/087546 discloses a robot-based crop-harvesting system comprising an autonomous robot.

Since the known systems are based predominantly on GPS, such solutions are expensive with regard to the licensing fees for obtaining satellite data. Such solutions, in addition, frequently make it necessary to process large volumes of data and along long data transmission paths. This is disadvantageous with regard to data security and also to data processing efficiency.

SUMMARY

In an embodiment, the present disclosure provides an apparatus for localizing an agricultural machine in an agricultural useful area. The apparatus includes an input interface configured to receive, as input, a route predefined in the useful area and image data related to a monitoring region of the useful area detected by a sensor and located in a vicinity of the agricultural machine. The apparatus also includes an evaluation unit configured to detect a position of the monitoring region with respect to the predefined route and an output interface configured to output the detected position.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
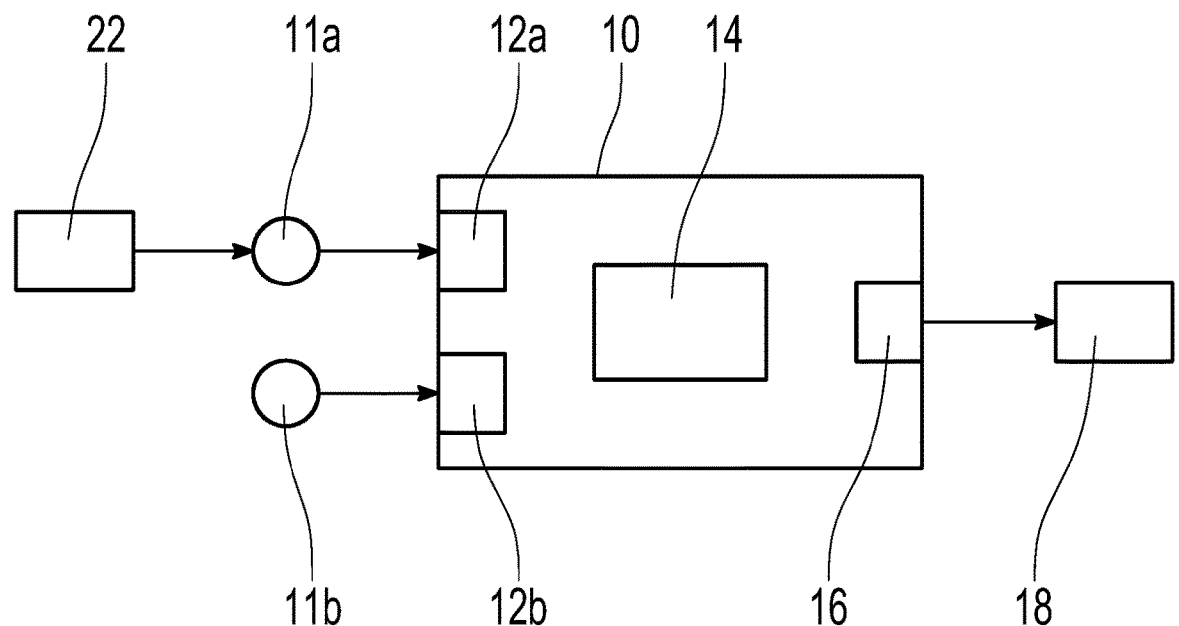
FIG. 1 is a schematic representation of an apparatus for localizing an agricultural machine according to one exemplary embodiment.

The present disclosure provides for improvements to the known systems for working agricultural useful areas in order to localize the agricultural machine more cost-effectively, with at least the same accuracy.

The present disclosure provides an apparatus used to localize an agricultural machine in an agricultural useful area. The agricultural machine can, for example, be a tractor, a threshing machine, a windrowing machine, a silo distributor or some other type of agricultural machine.

The apparatus comprises an input interface for inputting a predefined route in the useful area. The input interface may be any type of data interface. The predefined route is predefined in the agricultural useful area. For example, the route may be marked on a map that includes the extent of the agricultural useful area. For example, the map may include a grid map including a plurality of grid units. At least one attribute can preferably be assigned to at least some of the plurality of grid units. The at least one attribute can, for example, include information regarding the geographical conditions, the agricultural working processes of the unit area of the useful area corresponding to the associated grid unit. For example, this may be information regarding agricultural working processes or steps that have already been carried out and/or are still to be performed.

The input interface is additionally used to input image data related to a monitoring region of the useful area detected by a sensor and located in a vicinity of the agricultural machine. The sensor can be a camera, for example a stereo camera, a radar sensor, a LIDAR sensor and/or an ultrasonic sensor. The monitoring region covered by the image data of the sensor can, for example, include a circle or part-circle having a radius defined by the sensor, or alternatively a different shape. In particular, the monitoring region comprises the region of a field of view (FOV) of the sensor.

The localization apparatus further comprises an evaluation unit for detecting a position of the monitoring region with respect to the predefined route. Specifically, the evaluation unit detects in which section the monitoring region detected by the sensor at a given point in time is located on the predefined route. For this purpose, the evaluation unit divides the entire predefined route into a plurality of sections, wherein the lengths of the sections may be identical or different. Furthermore, the length may be variable. The evaluation unit can then carry out a comparison between the monitoring region and each of the plurality of sections. Based on this comparison, the evaluation unit can find the section that corresponds most probably to the monitoring region and is to be assigned thereto. In this way, the position of the monitoring region on the predefined route is detected, and the agricultural machine is thus localized.

The localization apparatus furthermore comprises an output interface for outputting the detected location. The output interface can be any communication interface. In particular, this can be a communication interface for wireless communication, for example Bluetooth, infrared, WLAN.

Compared with the devices known from the prior art, the apparatus is capable of locating the agricultural machine purely on the basis of data generated by the sensor, in particular camera images. This advantageously reduces, or even avoids, the disadvantages of GPS-based localization with regard to costs and the efficiency of data transmission and also data processing. The agricultural working of useful areas can therefore be carried out with increased cost and time efficiency.

According to a preferred embodiment, the evaluation unit is designed to ascertain a correlation value between the respective one of the plurality of sections of the predefined route and the monitoring region.

The correlation value is a measure of the extent to which two different objects have a certain correlation with respect to each other. In particular, the correlation value indicates to what extent the monitoring region corresponds to the respective section of the predefined route. This increases the accuracy and reliability of localization.

According to a further preferred embodiment, the evaluation unit is designed to determine from the plurality of sections the section with a maximum correlation value.

In this way, the section of the predefined route which corresponds most closely to the monitoring region of the sensor is identified. The agricultural machine can thus be localized on the basis of the position thereby found and related to the predefined route.

According to a further preferred embodiment, the evaluation unit is designed to recognize the monitoring region by means of segmentation in the image data.

The segmentation is preferably a semantic segmentation. In this way, the image data can be analyzed with increased accuracy and reliability in order to classify objects that occur in the image data. This improves the localization of the agricultural machine.

According to a further preferred embodiment, the localization apparatus further comprises a calibration unit for calibrating the sensor on the basis of the detected position of the agricultural machine.

The objects that occur in the image data generated by the sensor are displayed in the sensor images on the basis of an image coordinate system. In order to determine a correspondence relationship between the image coordinate system and a global coordinate system, global coordinates of the objects detected by the sensor are used. The correspondence relationship between the image coordinate system and the global coordinate system depends on the position of the sensor and, when the sensor is mounted on the agricultural machine, on the position of the agricultural machine. By using the detected position of the agricultural machine, the correspondence relationship can therefore be determined in a simplified manner.

According to a further preferred embodiment, the localization apparatus furthermore comprises a task assignment unit for assigning an agricultural task to the monitoring region on the basis of the detected position of the agricultural machine.

The at least one attribute which is assigned to one of the grid units on the map contains, for example, one or more tasks which have already been carried out and/or are to be carried out in the unit area corresponding to this grid unit. Task planning can hereby be carried out with increased efficiency and accuracy. The tasks may include "mowing grass," "windrowing grass," "harvesting cereal" and/or "picking fruit."

According to a further preferred embodiment, the localization apparatus furthermore comprises an optimization unit for optimizing the lateral position of the agricultural machine based on the detected position of the agricultural machine.

The detected position of the agricultural machine is the longitudinal position/location of the agricultural machine. However, it is possible for the agricultural machine to experience a lateral drift when traveling in the useful area along the predefined route. In order to counteract this lateral drift, it is helpful to determine a target position in the lateral direction based on the detected longitudinal position of the agricultural machine. The target position can be predefined for any point along the route and relative to a point on the agricultural machine, such as its center of gravity or geometric center. This makes it possible to implement the route in an improved manner, so that the agricultural working processes can be carried out better.

The computer program product is designed to be loaded into a memory of a computer and comprises software code sections with which the method steps of the method for route planning for a agricultural machine are executed when the computer program product runs on the computer.

A program is part of the software of a data processing system, for example an evaluation device or a computer. Software is a collective term for programs and associated data. The complement to software is hardware. Hardware refers to the mechanical and electronic aspects of a data processing system. A computer is an evaluation device.

Computer program products typically include a sequence of instructions that prompt the hardware, when the program is loaded, to carry out a particular method that leads to a particular result. When the program in question is used on a computer, the computer program product produces a technical effect, namely to improve the known systems for working agricultural useful areas to the effect that the agricultural machine is localized more cost-effectively, with at least the same accuracy.

The computer program product is platform-independent. This means that it can be run on any processing platform. The computer program product is preferably executed on an apparatus for route planning for an agricultural machine.

The software code sections are written in any programming language, for example in Python.

FIG. 1 shows a schematic representation of an apparatus 10 for localizing an agricultural machine 50 according to one exemplary embodiment.

The apparatus 10 comprises an input interface 12a for inputting image data 11a generated by a sensor 22. The image data 11a relate to a vicinity of an agricultural machine 50 (not shown in FIG. 1) in an agricultural useful area 60 that is to be worked (not shown in FIG. 1). The vicinity is detected as a monitoring region by the sensor 22. A further input interface 12b is used to input a predefined route 11b of the agricultural useful area 60. The predefined route 11b is preferably defined on a map, which further preferably comprises a grid map including a plurality of grid units. Furthermore, at least one attribute is preferably assigned to each of the grid units. The attributes can relate to information such as conditions in the part of the useful area corresponding to the associated grid unit with regard to its geographic nature, the utilization situation, in particular the crop designation, the designation and/or quantity of chemical/biological substances used, the composition of the soil in the respective grid units of the useful area. The attributes can, alternatively or additionally, relate to one or more agricultural working steps.

The apparatus 10 furthermore comprises an evaluation unit 14 for evaluating the image data 11a and the predefined route 11b in order to detect the position of the agricultural machine 50 relative to the route 11b. The evaluation unit 14 is preferably designed to derive the monitoring region from the image data 11a and to compare this with a plurality of sections of the predefined route 11b. In particular, the evaluation unit 14 can determine a correlation value between the monitoring region of the sensor and the respective section of the predefined route 11b. Based on the correlation values ascertained thereby, the evaluation unit 14 can identify the section of the predefined route 11b with the maximum correlation value. In this way, the position of the agricultural machine 50 relative to the predefined route 11b is determined. The apparatus 10 furthermore comprises an output interface 16 for outputting the position of the agricultural machine 50, determined as described above, to a task assignment unit, an optimization unit and/or a further unit.

Figure 2:
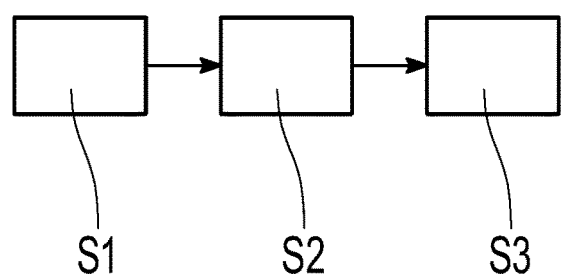
FIG. 2 is a schematic representation of a method for localizing an agricultural machine according to one exemplary embodiment.

FIG. 2 shows a schematic representation of a method for localizing an agricultural machine 50 according to one exemplary embodiment.

The method comprises a first step in which the route 11a, predefined in the useful area 60, and the image data 11b, related to the monitoring region in the useful area 60 detected by the sensor 22 and located in the vicinity of the agricultural machine 50, are input. The method further comprises a second step in which the position of the monitoring area region with respect to the predefined route 11a is detected. The method further comprises a third step in which the detected position is output.

Figure 3:
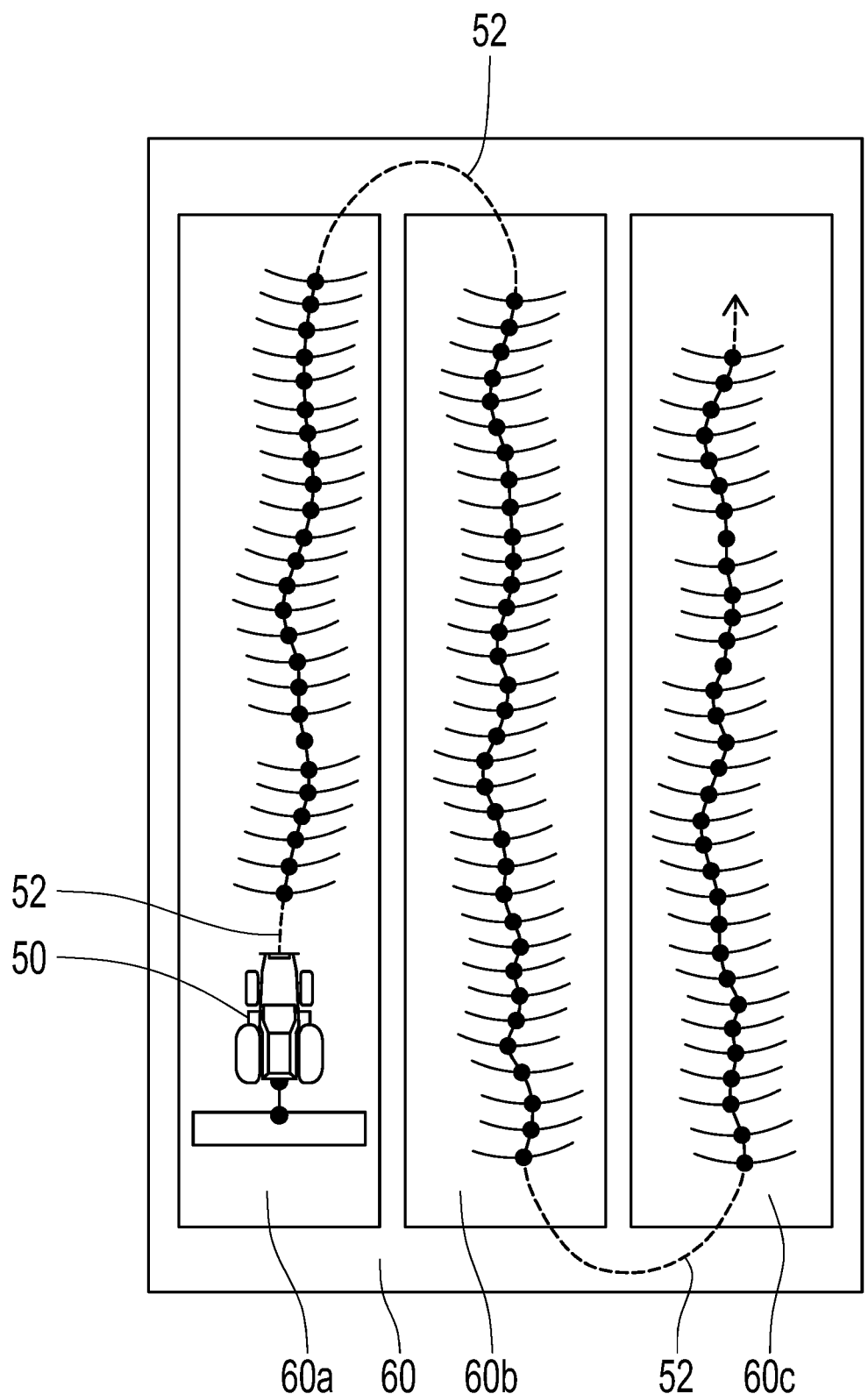
FIG. 3 a schematic representation of a route and the agricultural machine to be localized on the route.

FIG. 3 shows a schematic representation of a route 52 and the agricultural machine 50 to be localized on the route 52.

The agricultural machine 50 to be localized is shown in this example as a Schade-machine. The predefined route 52 extends across a plurality of planted regions 60a, 60b, 60c of the agricultural useful area 60, between which unplanted partition areas are arranged. An optimization unit of the apparatus 10 or, alternatively, an external optimization unit can detect an offset between the center of the agricultural machine 50 and the predefined route 10. FIG. 3 illustrates the target positions of the center of the agricultural machine 50 along the predefined route 52. By means of a control loop, it can be ensured that the center of the agricultural machine 50 always coincides with the respective target position. In this way, the lateral positioning accuracy of the agricultural machine 50 can be increased.

While subject matter of the present disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the invention defined by the following claims may cover further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Localization apparatus
12a, 12b Input interface
14 Evaluation unit
16 Output interface
18 External unit
22 Sensor
50 Agricultural machine
11b, 52 Route
60 Useful area
60a, 60b, 60c Planted regions of the useful area
S1 to S3 Method steps

The invention claimed is:

1. A method for localizing an agricultural machine in an agricultural useful area, the method comprising:
   detecting image data of a vicinity of the agricultural machine by a sensor, the image data being related to a monitoring region in the agricultural useful area;
   receiving as an input the detected image data and a route predefined in the agricultural useful area;
   detecting a position of the monitoring region with respect to the predefined route;
   outputting the detected position as an output signal;
   calibrating the sensor based on the detected position; and
   optimizing a lateral position of the agricultural machine based on the detected position.

2. A non-transitory computer readable medium having processor-executable instructions stored thereon, wherein the processor-executable instructions, when executed by one or more processors, facilitate performance of the method of claim 1.

3. The method of claim 1, further comprising:
   deriving the monitoring region from the image data; and
   comparing the derived monitoring region with a plurality of sections of the predefined route.

4. The method of claim 3, further comprising ascertaining a correlation value between the respective one of the plurality of sections of the predefined route and the monitoring region.

5. The method of claim 4, further comprising determining the section having a maximum correlation value from the plurality of sections.

6. The method of claim 1, further comprising recognizing the monitoring regions by segmentation in the image data.

7. The method of claim 1, wherein the sensor is a camera, a radar sensor, a light-detection and ranging sensor, and/or an ultrasonic sensor.

8. The method of claim 1, further comprising assigning an agricultural task to the monitoring region based on the detected position.

9. The method of claim 1, wherein the input is received in the agricultural machine, and wherein the agricultural machine is a vehicle.

\* \* \* \* \*